(12) United States Patent
Lesieur et al.

(10) Patent No.: US 6,773,684 B2
(45) Date of Patent: Aug. 10, 2004

(54) COMPACT FUEL GAS REFORMER ASSEMBLAGE

(75) Inventors: Roger R. Lesieur, Enfield, CT (US); Ned E. Cipollini, Enfield, CT (US); Thomas F. Fuller, Glastonbury, CT (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 649 days.

(21) Appl. No.: 09/814,911

(22) Filed: Mar. 23, 2001

(65) Prior Publication Data

US 2002/0102195 A1 Aug. 1, 2002

Related U.S. Application Data

(60) Provisional application No. 60/264,089, filed on Jan. 26, 2001.

(51) Int. Cl.[7] ............................................... F28D 00/00
(52) U.S. Cl. ..................... 422/198; 422/200; 422/204
(58) Field of Search ................................ 422/198, 200, 422/204

(56) References Cited

U.S. PATENT DOCUMENTS

| | | | | |
|---|---|---|---|---|
| 2,344,588 A | | 3/1944 | Blauvelt | 257/245 |
| 2,667,410 A | * | 1/1954 | Pierce | 48/127.9 |
| 2,711,419 A | * | 6/1955 | Milbourne | 48/197 R |
| 4,623,019 A | | 11/1986 | Wiard | 165/146 |
| 4,917,173 A | | 4/1990 | Brown et al. | 165/13 |
| 5,733,347 A | | 3/1998 | Lesieur | 48/61 |
| 6,117,578 A | * | 9/2000 | Lesieur | 429/19 |
| 6,413,479 B1 | * | 7/2002 | Kudo et al. | 422/198 |
| 6,492,050 B1 | * | 12/2002 | Sammes | 429/31 |

* cited by examiner

Primary Examiner—M. Alexandra Elve
(74) Attorney, Agent, or Firm—William W. Jones

(57) ABSTRACT

A fuel gas reformer assemblage for use in a fuel cell power plant is formed from a composite plate assembly which includes spaced-apart divider plates with columns of individual gas passages. The reformer assemblage is constructed from a series of repeating sub-assemblies, each of which includes a core of separate regenerator/heat exchanger gas passages. The core in each sub-assembly is sandwiched between a pair of reformer gas passage skins, which complete the assembly. Adjacent reformer gas/regenerator/reformer gas passage sub-assemblies in the composite plate assembly are separated from each other by burner gas passages. The regenerator/heat exchanger gas passages and the reformer gas passages in each sub-assembly are connected by gas flow reversing manifolds which form a part of each sub-assembly. The fuel gases flow in one end of the assemblage, through the reformer gas passages, and then reverse their direction of flow in the return manifolds so as to exit the reformer assemblage through the regenerator gas flow passages. The burner gases flow in one end of the reformer assemblage and out the other end. The walls of the burner and reformer gas flow passages are selectively catalyzed after the assemblage has been constructed.

7 Claims, 2 Drawing Sheets

COMPACT FUEL GAS REFORMER ASSEMBLAGE

This application claims the benefit of Provisional U.S. Ser. No. 60/264,089, filed Jan. 26, 2001.

DESCRIPTION

1. Technical Field

This invention relates to a light weight and compact fuel gas steam reformer design which is formed from a plurality of repeating gas flow modules. More particularly, this invention relates to a fuel gas steam reformer design which provides improved heat transfer between a burner gas stream and a fuel gas stream being reformed.

2. Background Art

Fuel cell power plants include fuel gas steam reformers which are operable to catalytically convert a fuel gas, such as natural gas, into hydrogen and carbon dioxide. The conversion involves passing a mixture of the fuel gas and steam through a catalytic bed which is heated to a reforming temperature of about 1,250° F. to about 1,600° F. Catalysts typically used are nickel catalysts which are deposited on alumina pellets. A typical reformer will consist of a plurality of reaction tubes which are contained in a housing that is insulated for heat retention. The reaction tubes are heated by burning excess fuel gas in the housing and passing the burner gases over the reaction tubes. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas-steam mixture flows through the catalyst beds. The resultant heated hydrogen, carbon dioxide and carbon monoxide gas mixture then flows through the central exhaust passages in each tube so as to assist in heating the inner portions of each of the annular catalyst beds; and thence from the reformer for further processing and utilization.

Steam reformers require a large amount of surface area in the catalyst bed in order to provide a high degree of catalyst-fuel mixture interaction and a large heat transfer surface area to produce the amount of hydrogen required to operate the fuel cells at peak efficiency. This need for a large catalyst bed and heat transfer surface area, when met by using catalyst-coated pellets in tubular reformers, results in undesirably large and heavy reformer assemblies. For example, a commercially available 200 KW acid fuel cell power plant includes a steam reformer component which has a volume of about 150 to about 175 cubic feet; and weighs about 3,500 lbs.

It would be highly desirable to provide a light weight and compact steam reformer which provides enhanced heat transfer without the need of an excessively large heat-transfer area, and is suitable for use in a mobile fuel cell power plant.

DISCLOSURE OF THE INVENTION

This invention relates to a hydrocarbon fuel gas reformer design which provides enhanced heat transfer without the need to unduly increase the size of the reformer. The general construction of the reformer of this invention is somewhat similar to the reformer described in commonly owned U.S. Pant. No. 6,117,578, granted Sep. 12, 2000, in that both utilize catalyzed wall fuel and burner gas passages for compactness and light weight. The disclosure of the '578 patent is incorporated herein in its entirety for purposes of enablement. The disclosure of commonly owned U.S. Pat. No. 5,733,347, granted May 31, 1998 is also incorporated herein in its entirety for purposes of enablement. The system described in the aforesaid '578 patent suggests the use of a counter-flow design between the burner gas passages and the adjacent process gas passages, which results in the maximum heat transfer from the burner gases to the process gas stream at a point, i.e., its exit end, where minimal heat transfer is needed and minimal heat transfer from the burner gas stream to the process gas stream at a point, i.e., its entrance end, where maximum heat transfer would be more desirable. In this type of reformer, the entry burner gas temperatures are about 2,400° F. and the exit burner gas temperatures are in the range of about 900° F. to 1,000° F.

Improved and more complete heat transfer is obtained by customizing the direction of flow of the fuel gas stream being reformed, and customizing the direction of flow of the burner gases which heat the fuel gas stream being reformed, in the improved heat exchange module. The reformer assembly modules will contain at least one process gas flow component which includes a sequence of process fuel gas flow paths; and at least one burner gas flow component which includes a sequence of burner gas flow passages. Each gas flow path component will include gas flow reversal manifolds which interconnect individual inlet gas flow passages and result in a reversal of the direction of gas flow to outlet gas flow passages in both the process fuel gas stream and in the burner gas stream so as to provide both co-flow and counter-flow of the process gas and burner gas streams.

Each of the process fuel gas components includes a pair of reforming process gas passages which are sandwiched around a regenerator process gas passage. The fuel gas stream to be reformed, which is referred to herein as the "process gas stream", or the "process gas", enters the fuel gas components through the two process gas passages flowing in the same direction, and then enters the regenerator process gas passage flowing in the opposite direction, thereby exiting the fuel gas components. A gas flow reversal manifold interconnects the reforming process gas passages with the regenerator process gas passage. The reformed process gas stream flowing through the regenerator process gas passage assists in heat transfer to the process fuel gas flowing through the adjacent reforming gas passages.

Each of the burner gas components includes at least two burner gas passages, which can be termed "incoming" and "outgoing" burner gas passages. The hotter burner gases flow into the burner gas component through the incoming burner gas passages and the lower temperature burner gases flow out of the burner gas component through the outgoing burner gas passages. Each of the incoming burner gas passages shares a common wall with one of the process gas passages in the reformer gas component so as to be disposed in heat exchange relationship with the one process gas passage; and each of the outgoing burner gas passages shares a common wall with the other of the reformer gas passages in the same reformer gas component so as to be in heat exchange relationship with the other of the reformer gas passages.

In each embodiment of the modules of the fuel gas reformer design of this invention, the high temperature burner gas stream flowing through the incoming burner gas passages in each of the burner gas components flows in the same direction as the first adjacent incoming process gas flow passage, a condition which we refer to herein as "co-flow"; and the lower temperature burner gas stream flowing through the outgoing burner gas passages flows in the opposite direction to the other incoming adjacent process gas flow passage in the reforming gas flow component, a condition which we refer to herein as "counter-flow". One of the objects of this invention is to maximize the amount of co-flow between the burner gas stream and the process gas stream, and minimize the amount of counter-flow, but not completely eliminate counter-flow. Thus, the incoming reformed gas stream in certain reformer gas stream components are subjected to heat exchange from both a co-flow burner gas stream, and heat exchange from a counter-flow burner gas stream, while others of the reformer gas stream components are subjected to heat exchange solely from co-flow burner gas streams. The co-flow, counter-flow design results in a more complete transfer of heat from the burner gases to the reformer or process gas without the need to unduly enlarge the reformer assembly, and also results in a lower burner gas stream outlet temperature. The incoming process gas stream is also subjected to heat exchange from the outgoing regenerated process gas stream. Each module may contain two process gas stream components combined with one burner gas stream component, as will be more fully explained hereinafter.

It is therefore an object of this invention to provide an improved heat exchange relationship between a burner gas stream component and a process fuel gas stream component in a hydrocarbon fuel gas reformer assembly which is suitable for use in a fuel cell power plant.

It is a further object of this invention to provide a hydrocarbon fuel gas reformer assembly of the character described which employs a combination of co-flow and counter-flow burner gas stream passages and process fuel gas passages in the burner gas and process gas components in each module.

It is yet another object of this invention to provide a hydrocarbon fuel gas reformer assembly of the character described which includes a counter-flow regenerator process gas passage which is disposed in heat exchange relationship with the reforming fuel gas passages in each of the process gas components.

It is a further object of this invention to provide a hydrocarbon fuel gas reformer assembly which is formed from repeating burner gas and process fuel gas passage modules.

It is an additional object of this invention to provide a hydrocarbon fuel gas reformer assembly which is able to utilize a single burner gas component to provide heat for reforming the hydrocarbon fuel gas in a plurality of process fuel gas components in a single module.

It is yet another object of this invention to provide a hydrocarbon fuel gas reformer assembly of the character described wherein the process gas components in a burner gas-process gas module will be subjected to a greater degree of co-flow with that burner gases than counter-flow with the burner gases.

These and other objects and advantages of this invention will become more readily apparent to one skilled in the art from the following detailed description of several embodiments of the invention when taken in conjunction with the accompanying drawings in which:

SPECIFIC MODES FOR CARRYING OUT THE INVENTION

Figure 1:
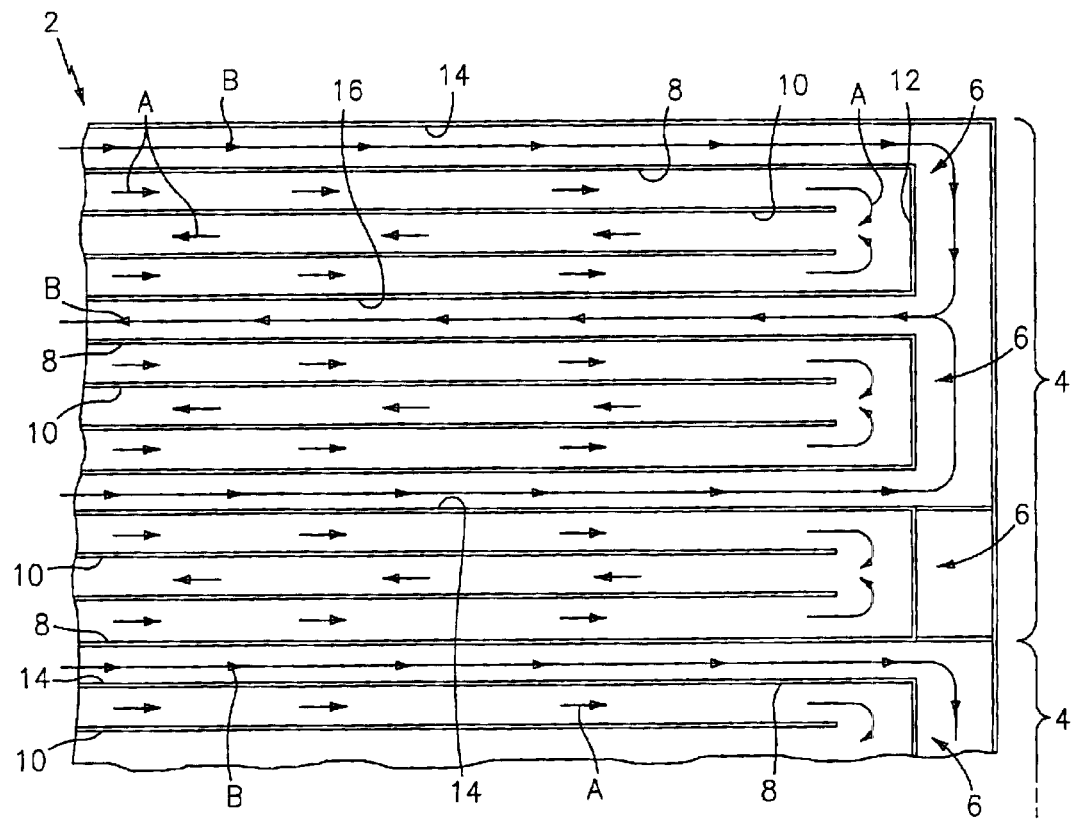
FIG. 1 is a schematic view of one embodiment of a hydrocarbon fuel gas reformer assembly formed in accordance with this invention which includes adjacent burner gas-process gas modules having one burner gas component and three process gas components.

Referring now to the drawings, there is shown in FIG. 1 a fragmented schematic view of a first embodiment of a reformer assembly which reformer assembly is denoted generally by the numeral 2, and which includes adjacent repeating burner gas-process gas modules which are denoted generally by the numeral 4. Each of the modules 4 shown in FIG. 1 includes a plurality of process gas components 6, and each of the process gas components 6 includes a pair of process gas inlet passages 8 which are sandwiched around a regenerator process gas outlet passage 10. The direction of process gas flow through the passages 8 and 10 is indicated by arrows A. The process gas passages 8 and 10 are interconnected by a flow-reversal manifold 12. The walls of the process gas passages 8, 10 and 12 are provided with a process gas reforming catalyst coating, as described in the aforesaid '578 patent.

It will be noted that in the reformer design embodiment shown in FIG. 1, two of the process gas reforming components 6 are provided with an inlet flow pattern burner gas stream B and adjacent incoming process gas stream A in a co-flow relationship, which is the most preferred heat transfer arrangement for the burner gas stream and the process gas stream, along with adjacent outgoing burner gas stream and incoming process gas stream in a counter-flow relationship, which is less preferred, but acceptable in combination with the co-flow relationships. In addition, the incoming process gas streams in the passages 8 in the third one of the process gas flow components 6 are both exposed to incoming burner gas stream co-flow conditions. Thus in the embodiment shown in FIG. 1, there are three process gas reforming components 6 and there are thus six process gas reforming passages 8. Of the six process gas reforming passages 8, four are disposed in the more desirable co-flow pattern with adjacent burner gas passages 14 and only two of the six process gas reforming passages 8 are disposed in the less desirable counter-flow pattern with adjacent burner gas passages 16. Thus the embodiment of the reformer modules 4 and their arrangement relative to each other shown in FIG. 1 both maximizes the amount of heat given off from the burner gas streams to the process gas reformer streams, and also provides a majority of the process gas reformer streams with the more desirable co-flow heat transfer pattern.

Figure 2:
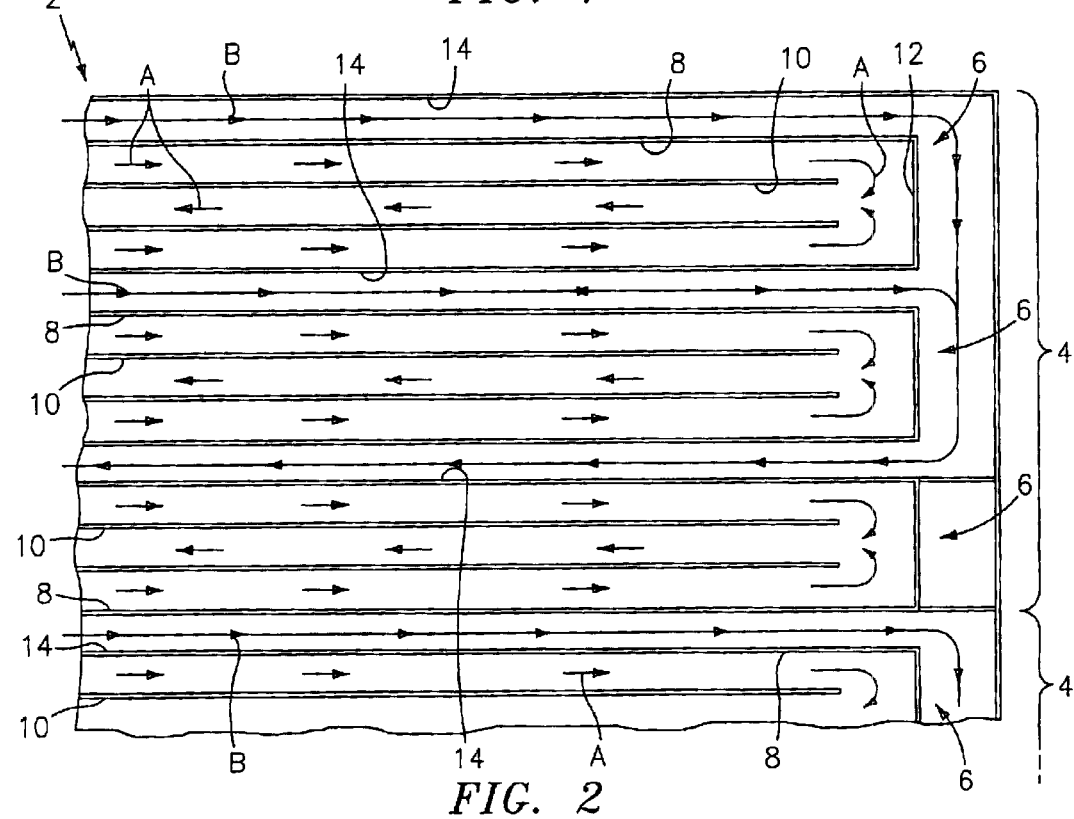
FIG. 2 is a schematic view of another embodiment of a fuel gas reformer assembly which is similar to FIG. 1, but with a different burner gas flow pattern.

Referring now to FIG. 2, there is shown a variation of the embodiment of the reformer assembly 2 which includes a series of modules 4 that have the same basic construction as the modules 4 in FIG. 1, but which utilize a slightly different burner gas flow pattern than that shown in FIG. 1. In the fragmented illustration of the embodiment shown in FIG. 2, it will be noted that the third from the top burner gas passage has been changed to a counter-flow passage 16 and the second from the top burner gas passage has been changed to a co-flow passage 14, as compared to the embodiment shown in FIG. 1. In the embodiment shown in FIG. 2, there are also three process gas reforming components 6 and there are thus six process gas reforming passages 8. As in the embodiment shown in FIG. 1, of the six process gas reforming passages 8 shown in FIG. 2, four are disposed in the more desirable co-flow pattern with adjacent burner gas passages 14 and only two of the six process gas reforming passages 8 are disposed in the less desirable counter-flow pattern with adjacent burner gas passages 16. Thus the configuration of the reformer modules 4 and their arrangement relative to each other which is shown in FIG. 2 both maximizes the amount of heat given off from the burner gas streams to the process gas reformer streams, and also provides a majority of the process gas reformer streams with the more desirable co-flow heat transfer pattern.

Figure 3:
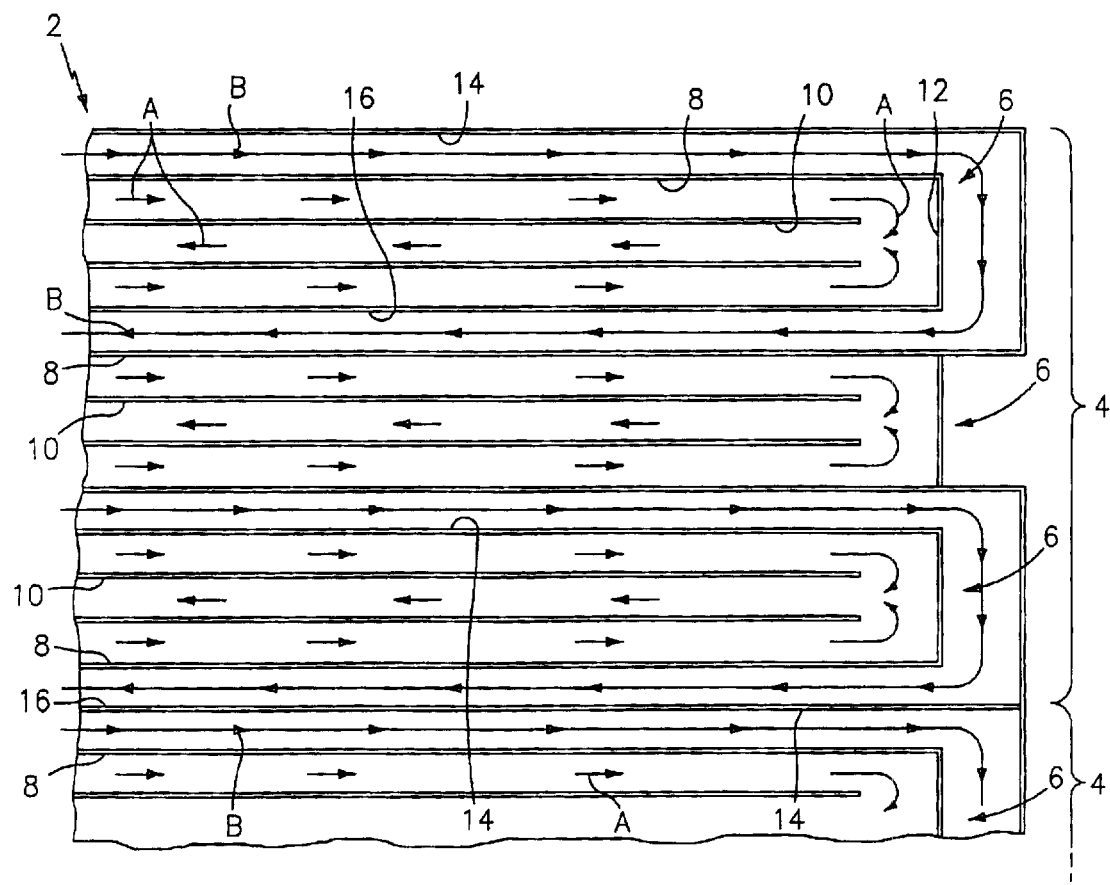
FIG. 3 is a schematic view of another embodiment of a fuel gas reformer assembly which is similar to FIGS. 1 and 2, but is formed from adjacent burner gas-fuel gas modules which include two fuel gas modules and a single burner gas module.

Referring now to FIG. 3, there is shown a third embodiment of a reformer assembly 2 which is formed in accordance with this invention. In the fragmented illustration of this embodiment of the invention, there are shown seven process gas reforming passages 8. Of the seven process gas reforming passages 8 shown, four are disposed in the more desirable co-flow relationship with adjacent burner gas passages 14; and the remaining three reforming passages 8 are disposed in the acceptable counter-flow relationship with the adjacent burner gas passages 14. It will be noted that in the embodiment shown in FIG. 3, there is still a majority of the co-flow gas passage relationships, and a minority of the counter-flow gas passage relationships.

Figure 4:
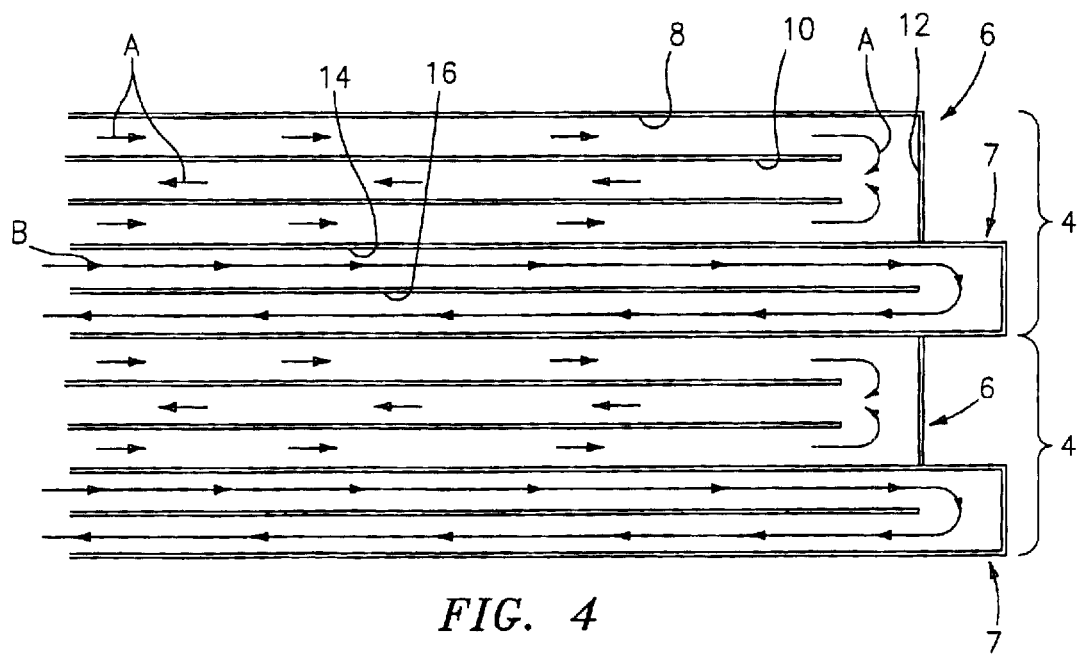
FIG. 4 is a schematic view of another embodiment of a fuel gas reformer assembly formed in accordance with this invention which includes adjacent burner gas-fuel gas modules each of which modules includes a single burner gas component and a single fuel gas component.

Referring now to FIG. 4, there is shown yet another embodiment of a reformer assembly 2 which is formed in accordance with this invention. In the fragmented illustration of this embodiment of the invention, there are shown two modules 4, each of which includes a process gas reforming component 6 and an adjacent burner gas component 7. Each module 4 in this embodiment of the reformer assembly 2 includes two process gas reforming passages 8 and two burner gas passages 14 and 16. In the embodiment shown in FIG. 4, there are the same number of co-flow relationships between process gas reforming passages and burner gas passages as the number of counter-flow relationships between process gas reforming passages and burner gas passages. Thus, this embodiment provides a 50/50 split of co-flow and counter-flow of reformer gases and burner gases in each module 4 in the reformer assembly 2, and therefore, the same split is provided in the entire reformer assembly 2.

It will be noted that when employing the combination co-flow and counter-flow design, the greatest heat transfer from the burner gas stream to the process gas stream occurs in at least half of the process gas streams in the reformer at the point where it is needed the most, i.e., at the entrance end of the process gas stream, and it is easily possible to design reformers where substantially more than half of the process gas streams are subjected to the greatest heat transfer at their entrance ends. When the co-flow/counter-flow combination design is employed, the entrance end burner gas temperatures will typically be in the range of about 2,300° F. to about 2,400° F., and the exit end burner gas temperatures will typically be in the range of about 800° F. to about 1,000° F. The use of a combination configuration with both co-flow and counter-flow burner gas stream/process gas stream results in an overall improved heat transfer within the combined configuration because the co-flow burner gas stream/process gas stream configuration maximizes the energy available to the process gas stream at the point of greatest energy requirement, i.e., at the process gas stream inlet. Since many changes and variations of the subject invention may be made without departing from the inventive concept it is not intended to limit the invention other than as required by the appended claims.

What is claimed is:

1. A hydrocarbon fuel gas steam reformer assembly comprising:
   a) a plurality of fuel gas passages for receiving a mixture of fuel gas and steam;
   b) a plurality of burner gas passages for receiving a burner gas stream, said burner gas passages and said fuel gas passages being disposed in heat exchange relationship with each other whereby heat from said burner passages is transferred to said fuel gas passages; and
   c) a first portion of said burner gas passages being disposed in a co-flow gas flow direction with adjacent fuel gas passages, and a second portion of said burner gas passages being disposed in a counter-flow gas flow direction with adjacent fuel gas passages, whereby burner gases in said first portion of said burner gas passages flow in the same direction as fuel gases in adjacent fuel gas passages, and burner gases in said second portion of said burner gas passages flow in an opposite direction as fuel gases in adjacent fuel gas passages.

2. The fuel gas steam reformer assembly of claim 1, wherein said first portion of said burner gas passages consists of at least about fifty percent of the plurality of burner gas passages in said assembly.

3. The fuel gas steam reformer assembly of claim 2, wherein said first portion of said burner gas passages consists of at least about sixty six percent of the plurality of burner gas passages in said assembly.

4. The fuel gas steam reformer assembly of claim 2, wherein said first portion of said burner gas passages consists of at least about seventy percent of the plurality of burner gas passages in said assembly.

5. The fuel gas steam reformer assembly of claim 1, wherein said first portion of said burner gas passages is in the range of about fifty percent to about seventy percent of the plurality of burner gas passages in said assembly.

6. The fuel gas steam reformer assembly of claim 1, wherein said assembly is made up of a sequence of modules which modules include burner gas passages and fuel gas passages, and wherein each of said modules includes said first portion of said burner gas passages in a concentration of at least about sixty six percent of the total number of burner gas passages in each of said modules.

7. A hydrocarbon fuel gas steam reformer assembly module comprising:

a) a plurality of fuel gas passages for receiving a mixture of fuel gas and steam;

b) one burner gas passage for receiving a burner gas stream, said burner gas passage and said fuel gas passages being disposed in heat exchange relationship with each other whereby heat from said burner gas passage is transferred to said fuel gas passages; and c) a first portion of said burner gas passage being disposed in a co-flow gas flow direction with adjacent fuel gas passages, and a second portion of said burner gas passage being disposed in a counter-flow gas flow direction with adjacent fuel gas passages, whereby burner gases in said first portion of said burner gas passage flow in the same direction as fuel gases in adjacent fuel gas passages, and burner gases in said second portion of said burner gas passage flow in an opposite direction as fuel gases in adjacent fuel gas passages.

* * * * *